United States Patent [19]

Ikeda et al.

[11] Patent Number: 4,679,863
[45] Date of Patent: Jul. 14, 1987

[54] EMERGENCY BRAKE COMMAND READ-CONVERT DEVICE FOR RAILWAY TRAIN HAVING CARS WITH PNEUMATIC AND CARS WITH ELECTRICAL BRAKE CONTROL

[75] Inventors: Mitsuhiro Ikeda, Amagasaki; Yasuo Nakao, Kobe, both of Japan

[73] Assignee: Nippon Air Brake Co., Ltd., Kobe, Japan

[21] Appl. No.: 857,693

[22] Filed: Apr. 29, 1986

[30] Foreign Application Priority Data

Apr. 30, 1985 [JP] Japan .................................. 60-94090

[51] Int. Cl.4 ........................ B60T 13/74; B60T 15/14
[52] U.S. Cl. .......................................... 303/3; 303/15; 303/16; 303/20; 303/66; 303/81; 303/DIG. 3; 188/158
[58] Field of Search ............................... 303/3, 2, 7-8, 303/66, 13-17, DIG. 3, 20, 26-28, 29, 30, 47, 59, 18, 60, 81, 33-38; 188/112, 3, 156-165; 246/167

[56] References Cited

U.S. PATENT DOCUMENTS

| | | |
|---|---|---|
| 3,709,564 | 1/1973 | Jeffrey et al. ........................ 303/16 |
| 3,716,274 | 2/1973 | Pier ...................................... 303/18 X |
| 4,181,369 | 1/1980 | Balukin et al. ........................ 303/16 |
| 4,239,292 | 12/1980 | Nagase ............................... 303/15 X |
| 4,306,752 | 12/1981 | Brandt ................................. 303/15 |
| 4,316,640 | 2/1982 | Cripe ................................... 303/20 |
| 4,533,185 | 8/1985 | Krause ................................. 303/3 |
| 4,598,953 | 7/1986 | Wood et al. ........................... 303/3 |
| 4,624,506 | 11/1986 | Doto ................................... 303/3 |

Primary Examiner—Douglas C. Butler
Attorney, Agent, or Firm—G. J. Falce

[57] ABSTRACT

A read-convert device for use on an electric brake command car of a railway train having pneumatic brake command cars. A control wire provides the electric emergency brake control on the electric brake command cars, while a brake pipe provides the pneumatic emergency brake control on the pneumatic brake command cars. A cut-off portion of the read-convert device connects a regulated source of pneumatic pressure to the brake pipe when an electric emergency release signal is provided by the control wire, provided a switch valve in the cut-off portion is set for electric brake command operation. Accordingly, an electrically-initiated, emergency brake application on the pneumatic brake command cars can be released through the control wire on the electric brake command cars.

12 Claims, 6 Drawing Figures

EMERGENCY BRAKE COMMAND READ-CONVERT DEVICE FOR RAILWAY TRAIN HAVING CARS WITH PNEUMATIC AND CARS WITH ELECTRICAL BRAKE CONTROL

BACKGROUND OF THE INVENTION

The invention relates to a read-convert device which read-converts the emergency brake command on railroad cars with different brake command systems, to operate the emergency brake at the same time in the situation where the railroad cars which are equipped with the brake systems of the different brake command systems are coupled so that they can operate together.

The prior art is described in Japanese Patent Publication No. 58-55023, and is illustrated in FIG. 6. This read-convert device 1 is installed, for example, on the electrical command system car E, which is connected to the air command system car A; and it consists of the discharge valve 2, on which the brake pipe BP of the air command system car is connected; the solenoid valve 3, which is installed in relation to this discharge valve 2; and the pressure switch 4, which is operated by the pressure in the brake pipe BP. The discharge valve 2 has the exhaust valve 2b, which opens and closes the exit 2a; and this exhaust valve 2b is installed on the bottom surface of the piston 2e, which divides the inside of the discharge vlave 2 into the upper chamber 2c and the lower chamber 2d, and the piston 2e is pushed by the spring 2f onto the valve seat of the exit 2a, to close the exit 2a. The above-mentioned lower chamber 2d connects the brake pipe BP.

With regard to the solenoid valve 3, the solenoid 3a is connected to ground and to the emergency brake command line EB for the emergency brake command of the electrical command system car, and has the flow inlet 3b which is connected to the brake pipe BP, flow outlet 3c which is connected to upper chamber 2c of the discharge valve 2, and the exit 3d which is open to the atmosphere.

The portion between the flow outlet 3c and the exit 3d is closed by the excitation of the solenoid 3a; and at the same time, flow inlet 3b and the flow outlet 3c are connected. By deenergizing the solenoid 3a, the portion between the flow inlet 3b and the flow outlet 3c is blocked; and at the same time, the flow outlet 3b is connected to the exit 3d.

The pressure switch 4 consists of the switching portion 4a, which opens and closes the emergency brake command line EB on the route to the brake system; and the drive portion 4b which moves the switch portion 4a to ON in response to a specified air pressure inside the brake pipe BP, and which turns it OFF as a result of the decrease in pressure.

The condition illustrated in the FIG. 6 illustrates the released brake, and the emergency brake command line EB is energized (electrically activated), the exit 2a of the discharge valve 2 is closed, the brake pipe BP is at a specified pressure (e.g. 5 kg/cm$^2$), and the switch portion 4a of the pressure switch 4 is ON.

When the brake pipe BP is depressurized from this state (in response to the operation of the brake valve which is located in the operator's console of the air command system car into the emergency brake position), the emergency brake operates in the air command system car. Also in the electrical command system car, the emergency brake operates, since the pressure switch 4 of the read-convert device 1 goes OFF, so that the emergency brake command line EB becomes deenergized.

In addition, if the emergency switch (known as the conductor valve of the air command system car) was operated, or if the train is separted between the air command system car and the electrical command system car, or between air command system cars, the emergency brake operates not only for the air command system cars but also for the electrical command system car in the same manner as described above, since the brake pipe BP is depressurized.

In addition, when the brake controller in the operator's console of the electrical command system car is placed in the emergency position and the emergency brake command EB is switched to the deenergized state, the emergency brake operates in the electrical command system car, and the solenoid 3a of the solenoid valve 3 of the read-convert device 1 deenergizes so that the upper chamber 2c of the discharge valve 2 is open to the atmosphere; therefore, the piston 2e moves upward to open the exit 2a. and the brake pipe BP is depressurized, and therefore the emergency brake of the air command system car also operates.

Besides this, if the operator's emergency switch (conductor valve) of the electrical command system car is operated, or if the train is separted between the electrical command system cars and the air command system cars, or between the electrical command system cars, the emeregncy brake command line EB becomes deenergized, so that the read-convert device 1 operates, and the emergency brake operates not only on the electric command system cars but also on the air command system cars in the same manner as described above.

The emergency brake command read-convert device 1 of the prior art described above has the disadvantage that the emergency brake of the air command system car cannot be released by the operator from his console in the electrical command system car, after the emergency brake has been operated from the operator's console in the electrical command system car.

In other words, if the emergency brake has been applied by operating the brake control in the operator's console of the electrical command system car, and then afterward, the brake control is set in the release position, the pressure of brake pipe BP cannot be raised, so that the emergency brake of the air command system car cannot be released.

In addition, when the conductor valve and the conductor switch are operated in the operator's console of the electrical command system car, and then they are returned to the original position, the emergency brake cannot be released either.

In this case, it is possible to feed air into the brake pipe BP by operating the brake valve in the operator's console of the air command system car; however, the brake valve and/or the brake controller which is not used while the train is running are normally fixed, or the handle is removed, so that they cannot be operated.

Therefore, when the operator's console of the electrical command system car is being used, air cannot so easily be fed into the brake pipe BP. Therefore, it takes time to get the car running again.

The cause of this problem is the fact that the read-convert device 1 has the function of a mutual read-conversion of the emergency brake command, but it does not have the function of supplying air to the brake pipe BP.

SUMMARY OF THE INVENTION

The object of this invention is to add the function of introducing air into the brake pipe BP, to the existing read-convert device, without impairing the existing read-convert function of the emergency brake command and the emergency brake release function while using the operator's console of the air command system car, so that when the emergency brake release command arises from the operator's console of the electrical command system car, air can be fed into the brake pipe BP of the air command system car.

In the railroad car emergency brake command read-convert device which is equipped with the pressure switch which converts the emergency brake command and release command in response to the brake pipe air pressure from the air command system car into an electrical command, and transfers it to the emergency brake command line of the electrical command system car, and the solenoid valve and the discharge valve which convert the electrical emergency brake command from the electric command system car into the emergency brake command by air pressure and transfer it to the above-mentioned brake pipe, the method of this invention is to use a pilot-type discharge valve as the discharge valve, and to provide a separate pressure-regulating valve; there is also a cut-off device, and the flow inlet of the solenoid valve is connected to the dispatch outlet of the pressure-regulating valve, and the flow outlet of the solenoid valve is connected to the pilot chamber of the pilot-type discharge valve.

The construction of the pilot-type discharge valve is such that, in the bottom position, the flow inlet and the flow outlet, which connect to the above-mentioned brake pipe, are connected and the exit is closed; and in the actuated position, the flow outlet is opened to the atmosphere via the exit, and the portion between the flow outlet and the flow inlet is blocked.

The pressure-regulating valve, in which the supply inlet is connected to the air source, regulates the air pressure in its dispatch outlet to a specified pressure. The cut-off device has the operational portion in the operator's console of the electrical command system car to open and close the communication between the dispatch outlet of the above-mentioned pressure-regulating valve and the flow inlet of the above-mentioned pilot-type discharge valve, and it switches to the cut-off state when the operator's console of the air command system car is in use.

In order to release the brake after the brake controller applies the emergency brake using the operator's console of the electrical command system car, the cut-off device is placed in the open position and the brake controller is placed in the released position, or the cut-off device may be connected to the brake controller, such as to open when the brake controller is operated in the release position, thereby introducing air into the brake pipe BP.

In other words, the cut-off device is in the state in which the dispatch outlet of the pressure-regulating valve is connected to the flow inlet of the pilot-type discharge valve, and when the brake controller is set in the release position (when the emergency brake release command is dispatched), the solenoid valve moves to the position in which it does not receive the emergency brake command, so that the air pressure from the pressure-regulating valve flows into the pilot chamber of the pilot-type discharge valve via the solenoid valve; and as a result, the discharge valve returns to the seated position, so that the air at a specified pressure from the pressure-regulating valve can be introduced into the brake pipe, and when the pressure inside the brake pipe increases, the emergency brake of the air command system car is released; at the same time, the pressure switch transfers the emergency brake release command to the emergency brake command line of the electrical command system car and the emergency brake of the electrical command system car is also released.

In addition, from the operator's console of the electrical command system car, and when the brake controller is in the released position, if the operator's switch (conductor valve) is operated and is then returned to position, the emergency brake is released in the same manner.

In addition, if the emergency brake has been applied, and is then to be released while the operator's console of the air command system car is in use, since the cut-off device is working, the supply of air from the pressure-regulating valve is blocked; and the only thing different from the case which uses the read-convert device of the prior art is that the pilot pressure of the pilot-type discharge valve is supplied from the pressure-regulating valve via the solenoid valve, and therefore it operates in almost the same manner as that of the prior art.

In addition, the read-convert device of the emergency brake command is carried out in the same way as the prior art at either time, either when the operator's console of the air command system car is in use, or when the operator's console of the electrical command system car is in use.

Other objects and attendant advantages of the invention will become apparent from the following more detailed explanation when taken in conjunction with the accompanying drawings, in which:

FIG. 1 is a schematic view showing a first embodiment of the read-convert device of the present invention, in which a cut-off portion is employed to provide auxiliary charging of the train brake pipe to effect release of an emergency brake application initiated from a car having an electrically-controlled brake, and to prevent auxiliary charging of the brake pipe during operation of the pneumatically-controlled brake, and during emergency application of the electrically-controlled brake;

DESCRIPTION AND OPERATION

Figure 1:
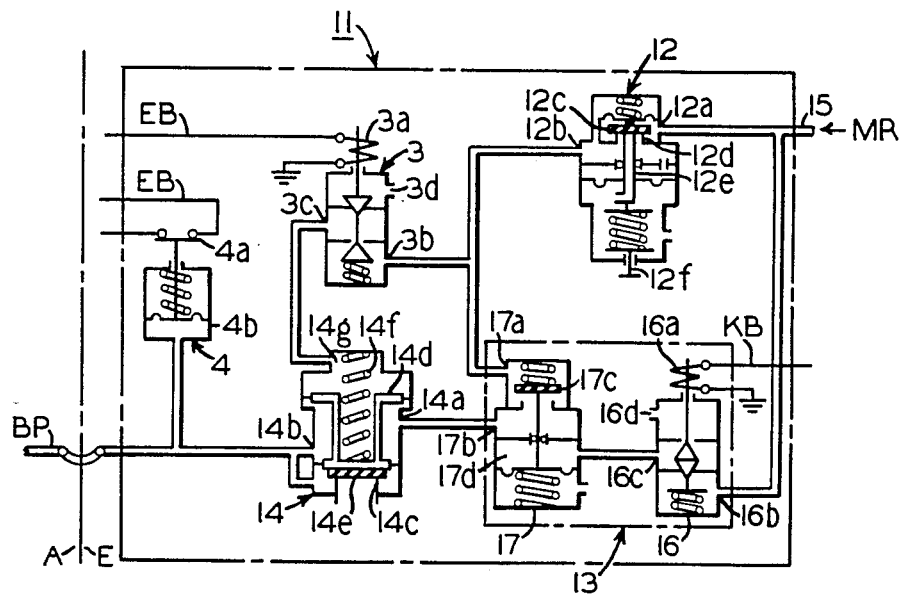
Figure 6:
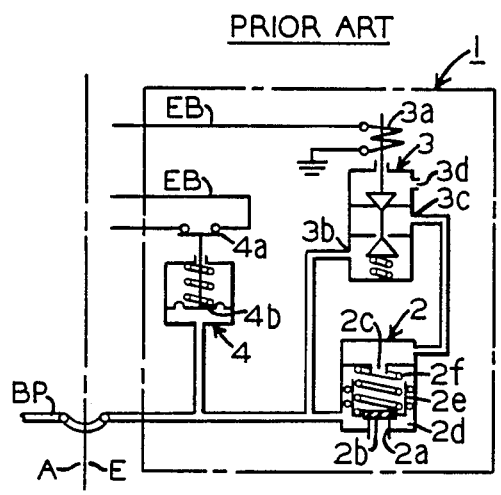
FIG. 6 is a schematic view of a read-convert device known in the prior art.

FIG. 1 shows the first embodiment. In this FIGURE, 11 is the read-convert device, and the point which differs from the read-convert device 1 of the prior art illustrated in FIG. 6 is that the pressure-regulating valve 12 and the cut-off device 13 are provided separately, and there is a pilot-type discharge valve 14 instead of the discharge valve 2. The pressure-regulating valve 12 decreases and regulates the compressed air (e.g. 7-8 Kg/cm$^2$) which is introduced into the supply inlet 12a from the air reservoir MR, which is the source of the air, via the air reservoir pipe 15, to the specified pressure (e.g. 5˙ Kg/cm$^2$), and sends it from the delivery outlet 12b.

And when the pressure at the delivery outlet 12b reaches a specified pressure, it automatically stops delivery; and when the pressure falls below a specified level, it resumes delivery.

In the FIG. 1, 12c is the supply valve, 12d is the valve seat, 12e is the exhaust valve rod, and 12f is the adjusting screw for setting the delivery air pressure.

The cut-off device 13 consists of the secondary solenoid valve 16 and switching valve 17, in this embodiment; and when the switch command line KB is energized, in other words, when the operator's console of the electrical command car is used, it supplies air from the dispatch outlet 12b of the pressure-regulating valve 12 to the flow inlet 14a of the discharge valve 14.

With regard to the secondary solenoid valve 16, the solenoid 16a is connected to the switch command line KB and to ground, and is excited when the operator's console of the electrical command system car is used, and the portion between the flow inlet 16b into which the compressed air from the air reservoir pipe 15 is supplied, and the flow outlet 16c is blocked; and at the same time, the flow outlet 16c is opened to the atmosphere via the exhaust outlet 16d.

When the operator's console of the air command system car is used, the solenoid 16a is deenergized, and the portion between the flow outlet 16c and the exhaust outlet 16d is closed; and at the same time, the portion between the flow inlet 16b and the flow outlet 16c is connected. The switch valve 17 is controlled by the air pressure at the flow outlet 16c of the secondary solenoid valve 16, and the valve 17 opens and closes the portion between the flow inlet 17a which connects to the delivery outlet 12b of the pressure-regulating valve 12, and the flow outlet 17b which connects to the flow inlet 14a of the discharge valve 14. When the compressed air is supplied to the diaphragm plate control chamber 17d from the secondary solenoid valve, the valve 17c closes; and when the diaphragm plate control chamber 17d is vented, valve 17c opens to the atmosphere via the secondary solenoid valve 16.

The discharge valve 14 has almost the same structure as the example of the prior art illustrated in the Japanese Patent Publication No. 58-54289, illustrated in FIG. 6. The flow inlet 14a, the flow outlet 14b, and the exhaust valve 14c are controlled so that they open and close in response to the movement of the piston 14d, and the valve 14e which is provided on the bottom surface of the piston 14d; and the piston 14d is controlled by the spring 14f, the pressure inside the pilot chamber 14g, and the pressure inside the brake pipe BP. The pilot chamber 14g connects to the flow outlet 3c of the solenoid valve 3, and the flow outlet 14b is connected to the brake pipe BP.

The discharge valve 14 is combined with the same one as the solenoid valve 3 of the device 1 of the prior art, illustrated in FIG. 6, but it differs from the prior art at the point where its flow inlet 3b is connected to the delivery outlet 12b of the pressure-regulating valve 12.

The piston 14d of the discharge valve 14 moves downward (status indicated in the FIG. 1) when the pilot chamber 14g is supplied with compressed air. In its lower position, the flow inlet 14a and the flow outlet 14b are connected open, and the exhaust outlet 14c is closed by the valve 14e. And, when pressure in the brake pipe BP is reduced to a specified value and the pilot chamber 14g is also exhausted, the piston 14d moves upward, pushed by the pressure of the brake pipe BP.

During ascent, the portion between the flow inlet 14a and the flow outlet 14b is blocked, and the flow outlet 14b is connected open to the exhaust outlet 14c.

The other parts have the same structures as the prior art shown in FIG. 6, so that they are identified by the same numbers, and an explanation of them has been omitted here.

In this read-convert device 11 of the first embodiment, the status illustrated in FIG. 1, in which the emergency brake command line EB and the switch command line KB are energized, is the brake release state when the brake controller of the electrical command system car is used. In this released state, when the emergency brake command was sent to the emergency brake command line EB, in other words, when the emergency brake command line EB becomes deenergized, the solenoid 3a of the solenoid valve 3 is deenergized.

Consequently, the solenoid valve 3 opens the pilot chamber 14g of the discharge valve 14 to the atmosphere, so that the piston 14d of the discharge valve 14 rises and opens the brake pipe BP to the atmosphere via the flow outlet 14b and the exhaust outlet 14c, and the discharge valve 14 assumes the discharge position.

Therefore, the brake pipe BP is depressurized and the emergency brake of the air command system car operates. When the brake pipe BP is depressurized, the switch portion 4a of the pressure switch 4 moves to OFF. In the electrical command system car, when the emergency brake command line EB becomes deenergized, the emergency brake operates.

The emergency brake operational state can be released by the brake controller in the operator's console of the electric command system car. In other words, when the brake controller is set in the release position, the emergency brake command line EB assumes the energized (electrically charged) state; but since the switch 4a of the pressure switch 4 is OFF, at first, the solenoid 3a of the solenoid valve 3 is excited and compressed air from the pressure-regulating valve 12 is fed into the pilot chamber 14g of the discharge valve 14 via the solenoid valve 3, and the piston 14d is kept in the lower position; the compressed air from the pressure-regulating valve 12 is fed into the brake pipe BP via the switch valve 17, and the discharge valve 14.

When the pressure inside the brake pipe BP increases, the emergency brake of the air command system car releases; and at the same time, the switch part 4a of the pressure switch becomes ON, and the entire line of the emergency brake command line EB becomes energized, so that the emergency brake of the electrical command system car also releases.

In addition, when the operator's console of the air command system car is in use, the switch command line KB is deenergized by the operation of a part not shown in the FIG. 1.

Figure 2:
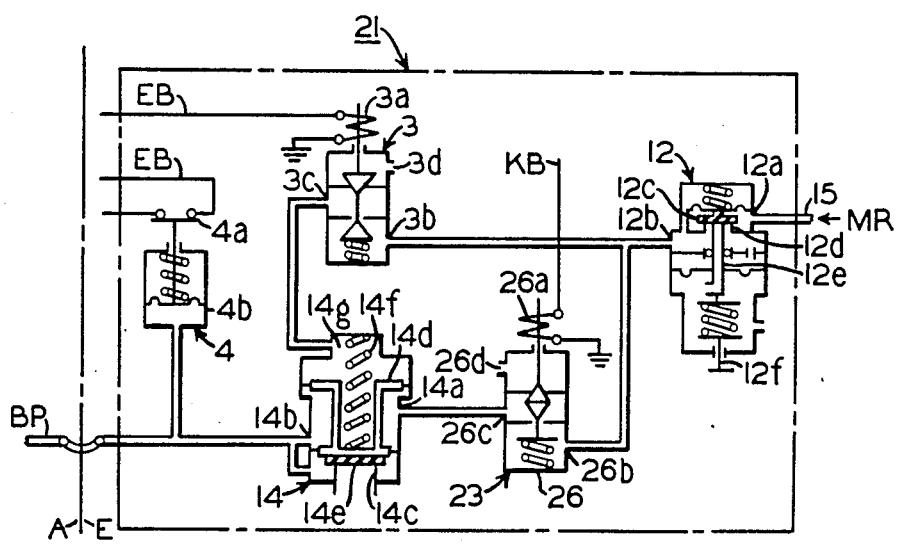
FIG. 2 is a schematic view, showing a second embodiment of the invention, arranged to eliminate a valve in the cut-off portion of FIG. 1.

FIG. 2 shows the second embodiment. The difference between the second embodiment and the first embodiment is that the solenoid valve 26, which is the same as the secondary solenoid valve 16 which was used on the first embodiment, is used independently as the cut-off device 23; and another difference is the fact that the switch command line KB is deenergized when the operator's console of the electrical command system car is in use.

In FIG. 2, the same parts as in FIG. 1 are identified by the same numbers.

In the FIG. 2, 26a is the solenoid, 26b is the flow inlet, 26c is the flow outlet, and 26d is the exhaust outlet of the secondary solenoid valve 26.

With regard to the secondary solenoid valve 26, the solenoid 26a is connected to the switch command line KB and the ground, the flow inlet 26b is connected to the delivery outlet 12b of the pressure-regulating valve 12, and the flow outlet 26c is connected to the flow inlet 14a of the discharge valve 14.

In the read-convert device 21 of the second embodiment, the condition indicated in the FIG. 2 is the released-brake state when the brake controller of the electrical command system car is in use, and the air from the pressure-regulating valve 12 is fed into the brake pipe BP via the secondary solenoid valve 26 and the discharge valve 14.

When the emergency brake command is sent to the emergency brake command line EB, and the solenoid 3a of the solenoid valve 3 is deenergized, the solenoid valve 3 exhausts the pilot chamber 14g of the discharge valve 14, in the manner as described above, and the piston 14d of the discharge valve 14 rises. The flow communication between inlet 14a and the flow outlet 14b is blocked; and at the same time, the flow outlet 14b gets connected to the exhaust outlet 14c, so that the emergency brakes on all the cars operate in the same manner as in the first embodiment.

In addition, if the operator's console of the air command system car is in use, the switch command line KB is energized (electrically charged) by the operating portion which is not shown in the FIGURE.

Figure 3:
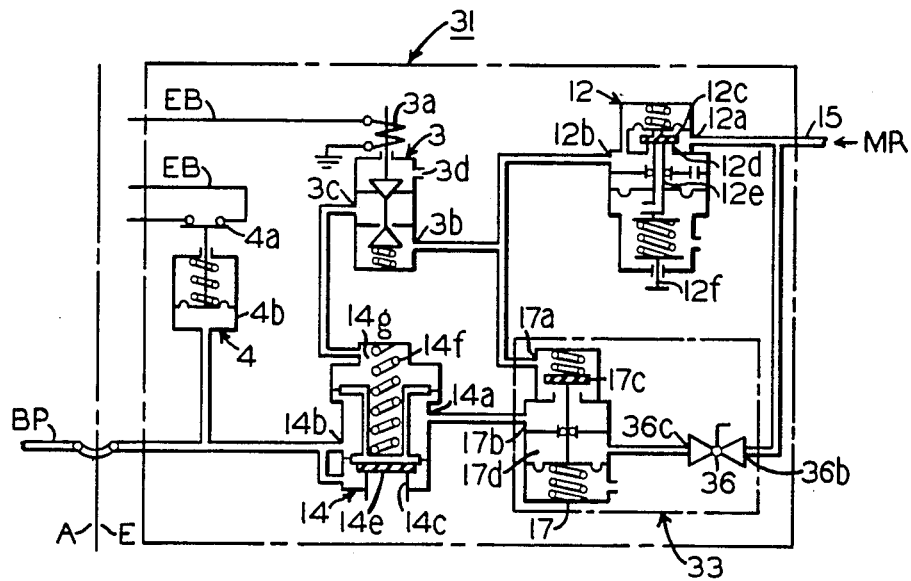
FIG. 3 is a schematic view, showing a third embodiment of the invention, in which a manually-operated valve is employed in place of the secondary solenoid-operated valve of FIG. 1.

FIG. 3 shows the read-convert device 31 of the third embodiment. In the third embodiment, the cut-off device 33 is one in which the secondary solenoid valve 16 of the cut-off device 13 of the first embodiment is replaced by a two-position, three-way valve 36.

In the FIG. 3, 36b is the flow inlet and 36c is the flow outlet; and in addition, there is an exhaust outlet which is not indicated in the FIGURE. The valve 36 is provided on the operator's console of the electrical command system car.

The valve 36 is set in the feed position in which the exhaust outlet is closed, and the flow inlet 36b and the flow outlet 36c are connected when the operator's console of the air command system car is in use, and it is set to close the flow inlet 36b and to connect the flow outlet 36c to the exhaust outlet when the operator's console of the electrical command system car is in use.

FIG. 3 indicates the released state in the case where the brake controller of the electrical command system car is used; and in this state, the discharge valve 14 closes the exhaust outlet 14c, and the air from the pressure-regulating valve 12 is supplied to the brake pipe BP via the switch valve 17 and the discharge valve 14. When the emergency brake assumes this position, as shown for the first embodiment, the emergency brake is in operation. To release it, if the brake controller is placed in the released position, the emergency brakes of all the cars are released in the same manner as for the embodiments described above.

Figure 4:
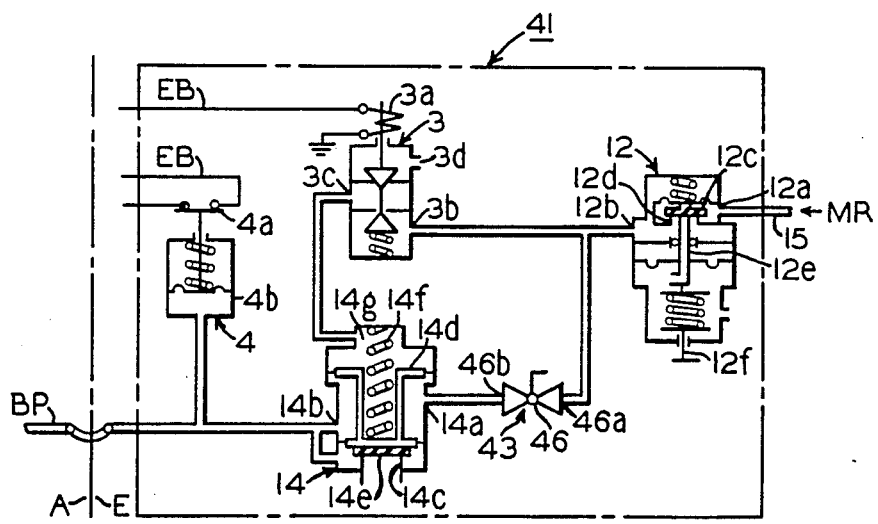
FIG. 4 is a schematic view, showing a fourth embodiment of the invention, in which a manually-operated valve is employed in place of the switch valve of FIG. 2.

FIG. 4 shows the read-convert device 41 of the fourth embodiment. In the fourth embodiment, the cut-off device 43 is one in which the secondary solenoid valve 26 of the cut-off device 23 of the second embodiment has been replaced by the open-close three-way valve 46, and its flow inlet 46a is connected to the delivery outlet 12b of the pressure-regulating valve 12, and its flow outlet 46b is connected to the flow inlet 14a of the discharge valve 14. The valve 46 is provided in the operator's console of the electrical command system car. When the operator's console of the air command system car is used, the valve 46 is set in the closed position, where the flow inlet 46a and the flow outlet 46b are blocked; and when the operator's console of the electrical command system car is used, the valve is set in the open position, as a result of which the flow inlet 46a and the flow outlet 46b are connected.

FIG. 4 shows the released state in which the operator's console of the electrical command system car is used, and the delivery outlet 12b of the pressure-regulating valve 12 is connected open to the brake pipe BP via the valve 46 and the discharge valve 14. When the emergency brake is applied in this state, the emergency brake operates in the same manner as in the second embodiment. To release it, when the brake controller is placed in the release position, the emergency brake is released in the same manner as the embodiments described above.

With regard to the first to fourth embodiments described above, the structure of each cut-off device is different, but the important thing is to establish the cut-off state between the delivery outlet 12b of the pressure-regulating valve 12 and the flow outlet 14a of the discharge valve 14 when the operator's console of the air command system car is used, and to establish a connection therebetween when the operator's console of the electrical command system car is used. As long as it can do this, it is fine.

By means of this invention, it becomes possible to feed air into the brake pipe of the air command system car, commanding from the operator's console of the electrical command system car without impairing the read-convert function of the emergency brake command read-convert device of the prior art, so that after the emergency brake is applied while the operator's console of the electrical command system car is being used, the emergency brake of the electrical command system car and the air command system car can be released immediately, and therefore the car can run again.

Figure 5:
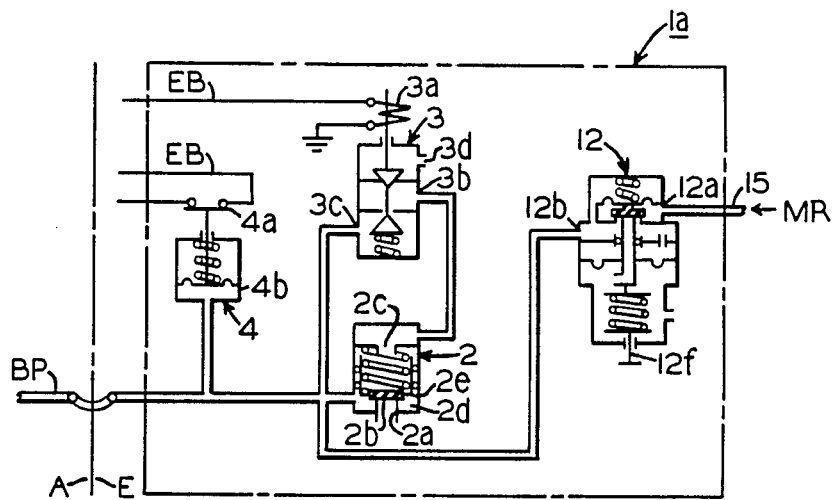
FIG. 5 is a schematic view of a further embodiment given consideration as a further simplified solution of the problem solved by the aforementioned embodiments.

A further arrangement considered to solve the problems of the prior art is shown by the structure of the read-convert device 1a, as shown in FIG. 5. This is a design in which the delivery outlet 12b of the pressure-regulating valve 12, which is shown in each embodiment described above, is connected directly to the brake pipe BP, which connects to the discharge valve 2 of the existing read-convert device 1 of the prior art, as illustrated in FIG. 6.

By means of this arrangement, it is possible to release the emergency brake, which used to be a problem, but the following disadvantages occur:

1. When the train is operated using the operator's console of the air command system car, the feeding of air into the brake pipe BP occurs in two places, namely, the brake valve and the read-convert device 1a; and besides that, the side of the read-convert device 1a is always in the state of feeding air.

Therefore, when the emergency brake is applied using the brake valve of the air command system car, the reduction of pressure of the brake pipe BP cannot be obtained in a short time. Therefore, the action of the emergency brake is delayed.

2. When the emergency brake is applied, the air reservoir of the electrical command system car is open to the atmosphere via the read-convert device 1a, so that the compressed air is released continuously, which represents a waste of energy.

Compared with this arrangement, as shown in FIG. 5, the arrangement according to the invention, is equipped with a cut-off device and a pilot-type discharge valve, so that the disadvantage described in (1) above can be eliminated, and the disadvantage described in (2) above can also be eliminated.

We claim:

1. In a railway train having at least one electric brake-controlled car with an emergency brake command wire extending therethrough, at least one pneumatic brake-controlled car with a brake pipe extending therethrough, and a source of fluid under pressure, there is provided on said at least one electric brake-controlled car a read-convert device comprising:
   (a) a fluid delivery path having first and second segments;
   (b) pressure-regulating valve means for connecting fluid under pressure from said source to said first and second segments of said delivery path at a certain chosen value;
   (c) a discharge valve having an outlet to which said brake pipe is connected, an inlet, an exhaust port, a pilot chamber, and a piston valve, said piston valve having a first position in which fluid pressure communication is established between said inlet and said outlet and is interrupted between said outlet and said exhaust port, and a second position in which fluid pressure communication is interrupted between said inlet and said outlet and is established between said outlet and said exhaust port to vent said brake pipe below said certain chosen value and accordingly produce an emergency brake application on said at least one pneumatic brake-controlled car;
   (d) pilot valve means operable in response to energization of said emergency brake command wire for establishing fluid pressure communication between said first segment of said delivery path and said pilot chamber to establish said first position of said piston valve and operable in response to deenergization of said emergency brake command wire for venting said pilot chamber to establish said second position of said piston valve; and
   (e) cut-off means selectively operable for connecting fluid under pressure from said second segment of said delivery path to said inlet of said discharge valve in order to recharge said brake pipe to said certain chosen value when said piston valve is in said first position, and thereby effect a release of said emergency brake application on said at least one pneumatic brake-controlled car.

2. A read-convert device, as recited in claim 1 further comprising pressure switch means for deenergizing said emergency brake command wire in response to a reduction of said brake pipe pressure to a value below said certain chosen value.

3. A read-convert device, as recited in claim 1 wherein said cut-off means comprises:
   (a) a two-position, two-way valve means for either establishing or interrupting fluid pressure communication between said second segment of said delivery path and said inlet of said discharge valve; and
   (b) changeover valve means for controlling the position of said two-position, two-way valve means depending upon whether said electric or said pneumatic brake-controlled car is providing said emergency brake application.

4. A read-convert device, as recited in claim 3 wherein said two-position, two-way valve means is a switch valve having an inlet to which said second segment of said delivery path is connected, an outlet connected to said inlet of said discharge valve, a control chamber, and a piston valve, said piston valve of said switch valve having a first position in which fluid pressure communication is established between said inlet and said outlet of said switch valve, and having a second position in which fluid pressure communication is interrupted between said inlet and oulet of said switch valve.

5. A read-convert device, as recited in claim 4 further characterized in that said piston valve of said switch valve occupies said second position in resonse to pressurization of said control chamber thereof, and occupies said first position in response to depressurization of said control chamber thereof.

6. A read-convert device, as recited in claim 4 wherein said changeover valve means is a two-position, three-way valve having a solenoid operator, an inlet connected to said source of fluid under pressure, an outlet connected to said switch valve control chamber, and an exhaust port.

7. A read-convert device, as recited in claim 6 further comprising a mode control wire via which said solenoid operator is energized when said emergency brake application is being provided by said at least one electric brake-controlled car, and via which said solenoid operator is deenergized when said emergency brake application is being provided by said at least one pneumatic brake-controlled car.

8. A read-convert device, as recited in claim 4 wherein said changeover valve means is a manually-operable, two-position, three-way valve device having an inlet connected to said source of fluid under pressure, an outlet connected to said switch valve control chamber, and an exhaust port.

9. A read-convert device, as recited in claim 1 wherein said cut-off means comprises a changeover valve means for either establishing or interrupting fluid pressure communication between said second segment of said delivery path and said inlet of said discharge valve.

10. A read-convert device, as recited in claim 9 wherein said changeover valve means is a two-position, three-way valve housing a solenoid operator, an inlet connected to said second segment of said delivery path, an outlet connected to said inlet of said discharge valve, and an exhaust port.

11. A read-convert device, as recited in claim 10 further comprising a mode control wire via which said solenoid operator is deenergized when said emergency brake application is being provided by said at least one electric brake-controlled car, and via which said solenoid operator is energized when said emergency brake application is being provided by said at least one pneumatic brake-controlled car.

12. A read-convert device, as recited in claim 9 wherein said changeover valve means is a manually-operable, two-position, three-way valve device having an inlet connected to said second segment of said delivery path, an outlet connected to said inlet of said discharge valve, and an exhaust port.

* * * * *

UNITED STATES PATENT AND TRADEMARK OFFICE
CERTIFICATE OF CORRECTION

PATENT NO. : 4,679,863
DATED : July 14, 1987
INVENTOR(S) : Mitsuhiro Ikeda, Yasuo Nakao It is certified that error appears in the above-identified patent and that said Letters Patent are hereby corrected as shown below:

Column 10, line 51, delete "housing" and insert --having--

Signed and Sealed this

Twelfth Day of April, 1988

Attest:

DONALD J. QUIGG

*Attesting Officer*    Commissioner of Patents and Trademarks